United States Patent [19]

Rollmann

[11] 4,322,506

[45] Mar. 30, 1982

[54] POLYPHENYLENE OXIDE/RUBBER BLENDING

[75] Inventor: Kent W. Rollmann, Bartlesville, Okla.

[73] Assignee: Phillips Petroleum Co., Bartlesville, Okla.

[21] Appl. No.: 106,989

[22] Filed: Dec. 26, 1979

[51] Int. Cl.³ .................. C08L 53/02; C08L 71/04
[52] U.S. Cl. ........................................................ 525/92
[58] Field of Search ................................ 525/92, 68; 260/33.6 UA

[56] References Cited

U.S. PATENT DOCUMENTS

| | | | |
|---|---|---|---|
| 3,639,508 | 2/1972 | Kambour | 525/92 |
| 3,660,531 | 5/1972 | Lauchlan et al. | 525/92 |
| 3,833,687 | 9/1974 | Lee | 525/92 |
| 3,835,200 | 9/1974 | Lee | 525/92 |
| 4,080,403 | 3/1978 | Gergen et al. | 525/92 |
| 4,158,028 | 6/1979 | Izawa et al. | 525/92 |
| 4,166,055 | 8/1979 | Lee | 525/92 |

*Primary Examiner*—Carman J. Seccuro

[57] ABSTRACT

Polyphenylene oxide is conveniently blended with conjugated diene-monovinylarene copolymers by using a mixed solvent of aromatic and paraffinic/cycloparaffinic hydrocarbons; preferably a polyphenylene oxide solution in an aromatic solvent is added to the copolymer cement prior to polymer recovery but after monomer polymerization is essentially complete.

6 Claims, No Drawings

POLYPHENYLENE OXIDE/RUBBER BLENDING

This invention relates to the blending of polyphenylene oxide and rubber. In another aspect, this invention relates to a modification of a solution polymerization process for the production of polyphenylene oxide containing rubber.

BACKGROUND

The polyphenylene oxide resins are a family of engineering thermoplastics that are well known to the polymer art. The polyphenylene oxides may be made by a variety of catalytic and non-catalytic processes from the corresponding phenols or reactive derivatives thereof. By way of illustration, certain of the polyphenylene oxides are disclosed in U.S. Pat. Nos. 3,306,874, 3,306,875, 3,257,357 and 3,257,358. In accordance with the prior art, the polyphenylene oxides can be prepared by an oxidative coupling reaction comprising passing an oxygen-containing gas through a reaction solution of a phenol and a metal-amine complex catalyst.

U.S. Pat. No. 3,356,761 discloses polyphenylene oxide resins prepared by dissolving a polyphenylene oxide in styrene monomer and the styrene monomer subsequently polymerized into polystyrene to produce a mixture of polyphenylene oxide and polystyrene, i.e. a polyphenylene oxide resin. U.S. Pat. Nos. 3,373,226 and 3,383,435 disclose other mixtures of polyphenylene oxide and a styrene resin.

Blending of polyphenylene oxide, or polyphenylene oxide resins, and conjugated diene-monovinylarene block copolymers has been observed previously to lead to compositions having useful properties. For example, the impact strength of a polyphenylene oxide resin can be significantly increased by the addition of a minor amount of a conjugated diene-monovinylarene teleblock copolymer, whereas the addition of a minor amount of a polyphenylene oxide resin to a conjugated diene-monovinylarene copolymer results in improved high temperature properties as well as improved tear and abrasion resistance.

Mechanical blending of a polyphenylene oxide and conjugated diene-monovinylarene copolymers results in blends having less than optimum physical properties. This is due to the requirement that mechanical blending to give a homogeneous blend must be conducted at temperatures above the glass transition temperature of the polyphenylene oxide (ca. 220° C.), which is too high for processing unsaturated conjugated diene-monovinylarene copolymers without serious degradation problems.

In a solution blending process one faces other difficulties. Polyphenylene oxide is insoluble in paraffinic or cycloparaffinic solvents at temperatures and pressures normally accessible with typically available plant equipment. On the other hand, hydrogenated conjugated diene-monovinylarene copolymers are insoluble or only difficultly soluble in paraffinic or cycloparaffinic solvent systems. Other solvent systems for the two different polymers exist but are unattractive economically.

STATEMENT OF THE INVENTION

It is thus one object of this invention to provide a solution blending process for blending polyphenylene oxide and conjugated diene-monovinylarene copolymers.

It is a further object of this invention to provide such a solution blending process for the two polymers mentioned which is readily and economically carried out.

A different object of this invention resides in the provision of a process for producing a conjugated diene-monovinylarene copolymer containing a small quantity of polyphenylene oxide.

Other objects, advantages, details, and embodiments of this invention will become apparent to those skilled in the art from the following detailed description of the invention and the appended claims.

In accordance with this invention there is now provided a process for solution blending polyphenylene oxides (either alone or in combination with a styrene resin) and conjugated diene-monovinylarene copolymers. This process comprises the use of an aromatic solvent together with a paraffinic or cycloparaffinic solvent. More specifically, in accordance with this invention a solution of polyphenylene oxide or a polyphenylene oxide resin as in an aromatic solvent is mixed with a solution of a conjugated diene-monovinylarene polymer in a paraffinic or cycloparaffinic solvent.

In accordance with a particularly preferred embodiment of this invention there is provided a process for producing a solution polymerized conjugated diene-monovinylarene rubber composition containing a minor quantity of polyphenylene oxide. This process in accordance with this invention provides for the addition of a polyphenylene oxide solution in an aromatic solvent to the polymer cement of the solution polymerization process. In this embodiment there is no necessity for redissolving the rubbery copolymer, but rather a solution of polyphenylene oxide is incorporated into the rubber solution prior to the final isolation of the rubber. This incorporation can be done at a stage where the solution polymerized conjugated diene-monovinylarene copolymer is still a living copolymer, i.e. a copolymer being terminated by an alkali metal such as sodium, potassium, or lithium. It is also within the scope of this invention to effect the addition of the polyphenylene oxide solution after the termination of the polymerization reaction, i.e. after the removal of the alkali metal from the solution polymerized conjugated diene-monovinylarene copolymer, e.g. the polyphenylene oxide solution can be added to a teleblock copolymer after the coupling step but prior to the recovery of the coupled copolymer by steam stripping or coagulation.

POLYPHENYLENE OXIDES AND POLYPHENYLENE OXIDE RESINS

The polyphenylene oxides have the repeating structural unit of the general formula:

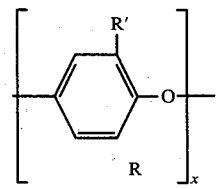

wherein the oxygen atom of one repeating unit is connected to the phenylene nucleus of the next repeating unit; R is a monovalent substituent selected from the group consisting of hydrogen, hydrocarbon radicals free of a tertiary α-carbon atom, halohydrocarbon radicals having at least two carbon atoms between the halogen atom and phenyl nucleus and being free of a tertiary α-carbon atoms, hydrocarbonoxy radicals free of aliphatic, tertiary α-carbon atoms and halohydrocarbonoxy radicals having at least two carbon atoms between the halogen atom and phenyl nucleus and being free of an aliphatic, tertiary α-carbon atom; R' is the same as R and may additionally be a halogen; and x may represent any whole integer greater than 100.

Examples of polyphenylene oxides corresponding to the above formula can be found in the above-referenced patents. Especially preferred is poly(2,6-dimethyl-1,4-phenylene oxide).

The polyphenylene oxides may be prepared in various ways. One method comprises oxidizing a phenol represented by the formula:

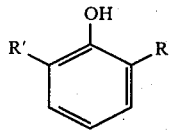

wherein R and R' have the same meanings given above. These phenols are oxidized by passing an oxygen-containing gas through the particular phenol in the presence of a catalyst system comprising a cuprous salt and a tertiary amine.

The polyphenylene oxide, which is used for blending with the conjugated diene-monovinylarene copolymer, preferably is the pure polymer, or alternatively, it may be a styrene resin modified-polyphenylene oxide, i.e. a blend of a polyphenylene oxide and a styrene resin.

The styrene resin is one having at least 25 weight percent of the polymer units derived from the compound having the formula:

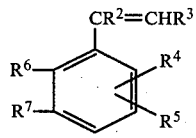

wherein $R^2$ and $R^3$ are selected from the group consisting of hydrogen and lower alkyl or alkenyl groups of from 1 to 6 carbon atoms; $R^4$ and $R^5$ are selected from the group consisting of chloro, bromo, hydrogen, and lower alkyl groups of from 1 to 6 carbon atoms; and $R^6$ and $R^7$ are selected from the group consisting of hydrogen and lower alkyl and alkenyl groups of from 1 to 6 carbon atoms or $R^6$ and $R^7$ may be concatenated together with hydrocarbyl groups to form a naphthyl group.

The term "styrene resin" as used herein includes by way of example, homopolymers such as polystyrene, poly(α-methylstyrene), and poly(chlorostyrene), the modified polystyrenes such as rubber modified polystyrenes, and styrene-containing copolymers, styrene-acrylonitrile copolymers, styrene-butadiene copolymers, styrene-acrylonitrile-α-alkyl-styrene copolymers, styrene-acrylonitrile-butadiene copolymers, and styrene-maleic anhydride copolymers. In addition, other suitable polymers include graft copolymers of styrene or α-methylstyrene polymerized on a polybutadiene or a butadiene-styrene copolymer, and graft copolymers of styrene or α-methylstyrene with vinyl monomers polymerized on a polybutadiene or a butadiene-styrene copolymer. The styrene resins described above may be prepared using polymerization methods described in such as Billmeyer's Textbook of Polymer Science, New York, Interscience Publishers, 1966.

The method of blending the polyphenylene oxide with the styrene resin, when a styrene resin modified-polyphenylene oxide is to be used in the process of this invention, is not critical and does not constitute a part of this invention. The preferred method comprises blending the polyphenylene oxide and the styrene resin in powder or granular form, extruding the blend, chopping into pellets and reextruding.

It is within the scope of this invention to incorporate the styrene resin into the overall polymer blend by solution blending the two. Thus, the styrene resin can also be dissolved with the polyphenylene oxide in the aromatic solvent and incorporated by blending with the conjugated diene-monovinylarene copolymer solution in the paraffinic or cycloparaffinic solvent.

The polyphenylene oxides and the styrene resins are combinable with each other in all proportions. Consequently, compositions comprising from 1 to 99 weight percent polyphenylene oxide and from 99 to 1 weight percent styrene resin are included within the scope of the invention. In general, compositions containing from 40 to 85 percent polyphenylene oxide and from 60 to 15 percent sytrene resin exhibit the best overall combination of properties and these compositions are preferred.

Suitable commercially available polystyrene-modified polyphenylene oxides are sold by General Electric under the trademark "Noryl."

CONJUGATED DIENE-MONOVINYLARENE COPOLYMERS

In general, any copolymer containing one or more blocks of polymerized monovinylarene and which is soluble in paraffinic or cycloparaffinic solvents is suitable for solution blending with polyphenylene oxides according to the process of this invention. Any monomer containing an active vinylidene group ($CH_2=C<$), a conjugated dienyl group, or having a cyclic ester structure (lactone), which is copolymerizable with a monovinylarene monomer, is suitable for preparing the polymers to be solution blended with the polyphenylene oxide. Presently preferred are the conjugated diene-monovinylarene teleblock copolymers represented by the general formula I or II,

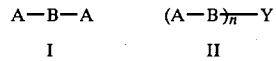

wherein A represents a block of polymerized monovinylarene monomer, B represents a block of polymerized conjugated diene units or of copolymerized conjugated diene and monovinylarene monomers, Y is the residual unit from a multifunctional coupling agent or a multifunctional initiating species and n has a value from 2 to 6.

In the embodiment where the conjugated diene-monovinylarene copolymer is a radial teleblock copolymer the incorporation of the polyphenylene oxide is preferably done as follows. A living polymer solution containing a living polymer having the formula A-B-L in a solvent is coupled as is well known in the art by a multifunctional coupling agent. In this formula L refers to an alkali metal. This coupling results in a teleblock copolymer dissolved in a paraffinic or cycloparaffinic solvent. After this coupling step the solution of the polyphenylene oxide in the aromatic solvent is blended into the coupled polymer solution. Thereafter, the polymer blend is recovered.

Conjugated dienes useful in the preparation of the linear and branched teleblock copolymers of this invention are generally those containing 4 to 12 carbon atoms per molecule, preferably those containing 4 to 8 carbon atoms per molecule. Specific examples of useful conjugated dienes include 1,3-butadiene, isoprene, 2,3-dimethyl-1,3-butadiene, piperylene, 3-butyl-1,3-octadiene, 2-phenyl-1,3-butadiene, and the like, and mixtures thereof. Especially preferred is 1,3-butadiene due to its availability and favorable cost.

The monovinylarene monomers which are employed with the above described conjugated dienes in forming the linear and branched teleblock copolymers include those containing from about 8 to 20 carbon atoms per molecule. Examples of specific monovinylarene monomers include styrene, α-methylstyrene, p-vinyltoluene, p-t-butylstyrene, and the like, and mixtures thereof. Presently preferred is styrene due to its availability.

Linear and branched teleblock copolymers of this invention can be prepared by techniques well known in the art. Such techniques are disclosed in U.S. Pat. Nos. 3,251,905, 3,281,383, 3,639,521, and 3,639,517. Typical of such techniques are the sequential polymerization of monomer increments initiated by organomonolithium compounds followed by optional coupling with polyfunctional coupling agents, and the sequential polymerization of monomer increments initiated by organomultilithium compounds.

The teleblock copolymers presently preferred for this invention generally contain from 15 to 90 weight percent polymerized conjugated diene units with the balance being polymerized monovinylarene units. Number average molecular weights of the useful copolymers are generally in the range of about 25,000 to 1,000,000 preferably in the range of about 100,000 to 400,000.

The hydrogenated analogues of these copolymers are also suitable for this invention.

BLEND COMPOSITION

The weight ratio of the polyphenylene oxide to the conjugated diene-monovinylarene block copolymer for solution blending according to the process of this invention can range from 99:1 to 1:99. If a composition having high impact strength is desired, the polyphenylene oxide portion of the blend is normally the major component. However, if a conjugated diene-monovinylarene copolymer having improved tear and abrasion resistance is desired, the conjugated diene-monovinylarene copolymer will normally be the major component. Furthermore, the addition of a minor amount of a polyphenylene oxide to a conjugated diene-monovinylarene copolymer results in sizable increases in the upper glass transition temperature of the copolymer. This results in improved retention of tensile strength at higher temperature, better resistance to heat distortion, but reduced melt flow. The preferred qualities of the blending process of this invention are shown in the following table for unhydrogenated and hydrogenated rubber copolymers respectively.

| PREFERRED QUANTITIES OF POLYPHENYLENE OXIDE AND SOLVENTS BASED ON 100 PARTS BY WEIGHT OF CONJUGATED DIENE-MONOVINYL ARENE COPOLYMERS | | | | |
|---|---|---|---|---|
| | Unhydrogenated | | Hydrogenated[1] | |
| | Usually employed | Preferred | Usually employed | Preferred |
| Polyphenylene oxide (parts by weight) | 5–60 | 15–30 | 5–60 | 15–30 |
| Aromatic solvent (parts by weight per 100 parts by weight polyphenylene oxide) | up to 2000[2] | 150–1000 | up to 2000[2] | 150–1000 |
| Paraffinic or cycloparaffinic solvent (parts by weight) | up to 2000[2] | 150–1000 | up to 2000[2] | 500–1000 |
| Weight ratio of aromatic to paraffinic (cycloparaffinic) solvent | ≧1:9 | 1:9 to 1:4 | ≧1:4 | 1:4 to 1:1.15 |

[1]This means that the olefinic unsaturation has been removed leaving the aromatic unsaturation unchanged.
[2]The lower limit depends on properties like stability of the polymers and on other process parameters.

Other materials can also be solution blended with the two polymers during the solution blending process of this invention. Materials which are soluble in one or both of the blending solvents such as extender oils, antioxidants, UV stabilizers, processing aids, fillers, vulcanization ingredients, plasticizers, other polymers, and the like, and mixtures of these, can be added in this manner. The material to be added can be dissolved with either polymer in the solvent used to dissolve that particular polymer, prior to mixing the two different polymer solutions, or alternatively, the material can be added to the mixed solvent solution of the two polymers being blended prior to polymeric blend isolation and recovery.

SOLVENTS FOR SOLUTION BLENDING

The solvents suitable for forming the solution of the conjugated diene-monovinylarene copolymer are preferably the same paraffinic and cycloparaffinic solvents used in the polymerization of these polymers. Preferably, the conjugated diene-monovinylarene copolymer is not isolated from the polymerization mixture prior to solution blending, but rather the polymer cement is used as is for blending with the solution of polyphenylene oxide. The conjugated diene-monovinylarene copolymers may, but are not required to be terminated prior to the solution blending step. If it is desirable to terminate the copolymer, this can be accomplished using a stoichiometric amount of an active-hydrogen containing compound, such as an alcohol, or an active halogen containing compound, such as benzyl chloride, care being taken not to add excessive terminating agent so as to precipitate the copolymer when the terminating agent is a non-solvent for the polymer. The terminating agent may also be a coupling agent, such as silicon tetrachloride, a multiepoxide, or any other coupling agent disclosed in the art. Suitable aliphatic solvents for the conjugated diene-monovinylarene copolymers include paraffinic and cycloparaffinic hydrocarbons, preferably those having 5 to 8 carbon atoms per molecule. Examples of suitable solvents include pentane, n-hexane, n-heptane, isooctane, 2,2,4-trimethylpentane, cyclopentane, and cyclohexane, alone or in admixture.

The concentration of the conjugated diene-monovinylarene copolymer in the paraffinic or cycloparaffinic solvent is that concentration which is practical and convenient, and is dependent only on such as the solution viscosity which can be tolerated and the requirement that the final mixed solvent after blending should be greater than 10 weight percent aromatic hydrocarbon solvent so as to prevent premature polyphenylene oxide precipitation.

The aromatic hydrocarbon solvents suitable for forming the solution of the polyphenylene oxides include aromatic hydrocarbon solvents which may or may not be ring-substituted with one or more paraffinic and cycloparaffinic side chains, wherein the total number of carbon atoms in all the substituents attached to the aromatic nucleus is about six or less. The total number of carbon atoms in the aromatic solvent preferably is 6 to 14. Examples of such solvents include benzene, toluene, cumene, the xylenes, the diethylbenzenes, mesitylene, p-cymene, and cyclohexylbenzene, alone or in admixture.

The concentration of these polyphenylene oxide solutions is limited only by those practical and convenience considerations as described for the solutions of the conjugated diene-monovinylarene copolymers.

As previously described, the composition of the mixed solvent of the blended solutions should consist of at least 10 weight percent aromatic solvent, more typically at least 20 weight percent aromatic solvent so as to prevent precipitation of the polyphenylene oxide during the blending and prior to isolation of the blended polymeric composition.

SOLUTION BLENDING CONDITIONS

The two solutions to be blended, i.e. the paraffinic or cycloparaffinic solution of conjugated diene-monovinylarene copolymer and the aromatic hydrocarbon solution of the polyphenylene oxide, are mixed together by any method which insures intimate blending of the dissolved polymers, and can be accomplished by mechanical stirring, or by tumbling in a closed container, at temperatures and pressures sufficient to maintain the polymers in solution. Typically, the temperature is maintained within the range of about 25° C. up to the boiling point of the lowest boiling solvent being used. Thus, the blending temperature typically will be between 25° C. and 175° C. The duration of the mixing or blending step is for that period of time which will result in the formation of a homogeneous solution of the polymers being blended in the solvent mixture. If the conjugated diene-monovinylarene copolymer has not been terminated prior to the blending step, the blending operation should be conducted under an inert atmosphere, and care should be taken not to introduce impurities which can be terminating or coupling agents, such as oxygen, carbon monoxide, and carbon dioxide.

Following formation of the homogeneous solution of the blended polymers, the polymeric blend composition can be isolated by typical recovery methods such as steam stripping, followed by separation of the precipitated polymeric blend by filtration, decantation, or other suitable methods.

EXAMPLE I

This example illustrates the suitability of using a mixed aromatic/aliphatic solvent system for solution blending polyphenylene oxide and a butadiene-styrene copolymer.

Forty-five grams of Solprene ® 475 (an oil-extended 60/40 butadiene/styrene radial teleblock copolymer having $M_w/M_n$ of about 240,000/180,000, and containing 50 parts of naphthenic oil per 100 parts of rubber; manufactured and sold by Phillips Petroleum Company), 6 grams of poly(2,6-dimethyl-1,4-phenylene oxide), and 313 grams total of cyclohexane and/or toluene were placed in a 1700 ml. capacity, heated, stirred, glass reactor vessel and maintained until all of the polymer was dissolved. The polymer solution was then transferred through a steam-jacketed line to a 1700 ml. capacity, heated, stirred, glass steam stripper vessel containing 200 ml. of water, 0.05 g of calcium chloride, and 0.20 g of Tamol 731 (a 25 weight percent aqueous solution of the sodium salt of a diisobutylene/maleic anhydride copolymer sold by Rohm and Haas), steam being added continuously to the aqueous solution-polymeric hydrocarbon solution mixture to vaporize the solvent. The precipitated polymeric blend was separated and dried, and compression molded into test specimens for physical property evaluation. Table I shows the properties of the polyphenylene oxide/butadiene-styrene radial teleblock copolymer blends as a function of the solvent which was used, and the temperatures used to dissolve the polymers and to steam strip the polymeric blends.

TABLE I

Physical Properties of Blends[a] of Butadiene-Styrene Radial Teleblock Copolymer[b] and Poly(2,6-dimethyl-1,4-phenylene Oxide) Solution Blended in Cyclohexane and/or Toluene

|  | Run 1 | Run 2 | Run 3 | Run 4 |
|---|---|---|---|---|
| Cyclohexane/toluene weight ratio | 100/0 | 100/0 | 0/100 | 70/30 |
| Temperature, °C. |  |  |  |  |
| To dissolve polymers | 137 | 136 | 108 | 119 |
| To steam strip blend | 107 | 127 | 105 | 106 |
| Melt flow of blend[c] | 59 | 28 | 15 | 31 |
| Tensile (60° C.), MPa[d] | 5.0 | 5.6 | 7.0 | 6.7 |
| Distortion (100° C.), %[e] | 5.5 | 1.4 | 1.3 | 2.7 |

[a]All blends consist of 100 parts of butadiene-styrene radial teleblock copolymer, 50 parts of naphthenic oil, and 20 parts of poly(2,6-dimethyl-1,4-phenylene oxide), parts being by weight.
[b]Added as Solprene 475 ®.
[c]ASTM D1238-73; condition F.
[d]ASTM D412-75.
[e]ASTM D2633-76.

These data illustrate that the use of a 70/30 weight ratio of cyclohexane/toluene as blending solvent (Run 4), as would be the situation if a polyphenylene oxide were dissolved in toluene and then added to a butadiene-styrene copolymer solution in cyclohexane (the polymer cement from a typical butadiene-styrene polymerization), allows blending and steam stripping within a reasonable, readily accessible temperature range, and that the properties of the blend so attained are within the range considered to be adequate for this composition. In contrast, the use of cyclohexane as the sole blending solvent at a polymer dissolution temperature of 137° C. and a solvent stripping temperature of 107° C. (Run 1) results in a blend having poorly dispersed poly(2,6-dimethyl-1,4-phenylene oxide) as shown by a high melt flow, the poly(2,6-dimethyl-1,4-phenylene oxide) apparently being present more like a filler in rubber rather than the poly(2,6-dimethyl-1,4-phenylene oxide) being incorporated into the polystyrene domains of the rubber. The poor dispersion also shows itself by the relatively poor tensile and distortion properties. Raising the stripping temperature (Run 2) results in improved dispersion as shown by relatively lower melt flow and better tensile and distortion properties. However, the high steam stripping temperature required to give these improved properties limits its use due to unfavorable economics (steam and special equipment cost) making these conditions unsuitable for many commercial operations. Use of toluene as the sole solvent (Run 3) does allow the use of the lowest dissolving and stripping temperatures and results in the best overall blend properties. However, in a commercial operation wherein the butadiene-styrene copolymer is prepared in a paraffinic or cycloparaffinic solvent, the use of toluene as the sole blending solvent would require isolation of the rubber from the polymerization solvent and then redissolving in toluene for blending with the poly(2,6-dimethyl-1,4-phenylene oxide). This procedure is economically unattractive.

EXAMPLE II

This example illustrates the improved 60° C. tensile strength of solution blended mixtures of poly(2,6-dimethyl-1,4-phenylene oxide) and butadiene-styrene copolymer compared to identical mechanical blended mixtures.

A 10 weight percent solution of a 70/30 butadiene/styrene radial teleblock copolymer in cyclohexane was prepared from 36.6 grams of the rubber and 330 grams of cyclohexane, and 15.1 weight percent solution of poly(2,6-dimethyl-1,4-phenylene oxide) in toluene was prepared from 14.76 grams of the polyphenylene oxide and 83 grams of toluene. The rubber and polyphenylene oxide solutions were prepared in separate beverage bottles (26 oz. bottle for the rubber solution and a 10 oz. beverage bottle for the polyphenylene oxide solution) equipped with crown caps over self-sealing rubber gaskets. The bottles and their contents were tumbled in a 50° C. constant temperature bath until all solids were dissolved. The polyphenylene oxide solution was then added to the rubber solution in the 26 oz. beverage bottle to give a solution having a cyclohexane/toluene weight ratio of 80/20 and this mixture then tumbled in a 70° C. constant temperature bath for about 1 hour. The polymeric blend, which contained 40 phr of poly(2,6-dimethyl-1,4-phenylene oxide) was isolated from the mixed hydrocarbon solvent by slowly pouring the mixed polymer solution into a beaker of heated water through which high pressure steam was being bubbled (phr=parts by weight per 100 parts by weight of rubber). After all the mixed hydrocarbon solvent had vaporized, the precipitated polymeric blend was separated and dried for about 15 hours at 60° C. under reduced pressure.

In like manner, similar blends containing 40 parts of poly(2,6-dimethyl-1,4-phenylene oxide) per 100 parts of 70/30 butadiene/styrene radial teleblock copolymer were prepared from 10 and 20 weight percent rubber solutions in cyclohexane, but the weights of the polymers and the solvents used were varied so that the mixed solvent used during blending had cyclohexane/toluene weight ratios of 70/30 and 50/50.

As controls, a solution blend containing 40 parts of the same poly(2,6-dimethyl-1,4-phenylene oxide) per 100 parts of the same 70/30 butadiene/styrene radial teleblock copolymer was prepared using toluene as the only solvent, and the same blend was also prepared by machanically blending the two polymers in a BR-Banbury mixer for 5.5 minutes and dumping at a temperature of 227° C. For further comparison standards, the 70/30 butadiene/styrene radial teleblock copolymer without added poly(2,6-dimethyl-1,4-phenylene oxide) was dissolved in toluene, and then isolated by steam stripping, and a second sample of the rubber was maintained in a BR-Banbury mixer for 5 minutes and dumped at a temperature of 193° C. Test specimens were compression molded and the tensile strengths determined at 60° C. for these mechanical and solution blended samples and controls. Results are shown in Table II.

TABLE II

Physical Properties of Mechanical and Solution Mixed Blends of Poly(2,6-dimethyl-1,4-phenylene Oxide)[a] And 70/30 Butadiene/Styrene Radial Teleblock Copolymers[b]

| Run | PPO,[a] phr | % Rubber in Cyclohexane Solution | Treating or Blending Method | Cyclohexane /Toluene Wt. Ratio | Tensile (60° C.), MPa[c] |
|---|---|---|---|---|---|
| 5 (Standard) | 0 | — | Mechanical[d] | — | 1.01 |
| 6 (Standard) | 0 | — | Solution | 0/100 | 0.87 |
| 7 (Control) | 40 | — | Mechanical[e] | — | 10.8,14.4[f] |
| 8 (Control) | 40 | — | Solution | 0/100 | 17.5 |
| 9 | 40 | 10 | Solution | 80/20 | 17.5 |
| 10 | 40 | 10 | Solution | 70/30 | 22.8 |
| 11 | 40 | 20 | Solution | 70/30 | 15.7 |
| 12 | 40 | 20 | Solution | 50/50 | 25.0 |

[a]Poly(2,6-dimethyl-1,4-phenylene oxide) having $M_w$ of about 26,200.
[b]Solprene® 416, a 70/30 butadiene/styrene radial teleblock copolymer having $M_w/M_n$ of about 150,000/120,000.
[c]ASTM D412-75.
[d]Rubber alone mixed in BR-Banbury mixer for 5 minutes and dumped at 193° C.
[e]Mixed in BR-Banbury mixer for 5.5 minutes and dumped at 227° C.
[f]Duplicate determinations.

These data illustrate the superior 60° C. tensile strengths of polymeric blends prepared in mixed solvent systems at various solvent ratios (Runs 9, 10, 11, and 12), compared to a similar blend prepared by mechanical blending at 227° C. (Run 7). In addition, use of a mixed solvent system is shown generally to give blends having 60° C. tensile strengths at least as good as blends prepared using toluene as the only solvent (Run 8). The difference in properties between the mechanically blended and solution blended polymeric compositions is believed to be due to the failure of the poly(2,6-dimethyl-1,4-phenylene oxide) to be completely incorporated into the polystyrene domains of the rubber by the mechanical blending method and not a function of an inherent difference in properties of a butadiene-styrene copolymer subjected to mechanical and solution blending. This appears to be confirmed by the equivalent 60° C. tensile properties of rubber subjected to mechanical and solution blending conditions (Runs 1 and 2). Use of a higher mechanical blending temperature so as to be well above the glass transition of the polyphenylene oxide and which should improve the homogeniety of the blend, is not feasible due to rubber degradation at such a high temperature. Some degradation appeared to have occurred at the 227° C. blending temperature used in Run 7 as indicated by the inability to injection mold this sample at 220° C. following the blending step.

Reasonable variations and modification which become apparent to those skilled in the art can be made in this invention without departing from the spirit and scope thereof.

I claim:

1. A process for mixing polyphenylene oxide and conjugated diene-monovinylarene copolymer containing one or more blocks of polymerized monovinylarene comprising mixing a polymer cement, polyphenylene oxide and an aromatic solvent and recovering a polymer blend from the polymer solution so obtained;

wherein said polymer cement comprises a solution of said conjugated diene-monovinylarene copolymer in a paraffinic or cycloparaffinic solvent;

wherein said polymer cement is obtained from a solution polymerization process in which conjugated diene and monovinylarene have been polymerized; and wherein the weight ratio of aromatic solvent to paraffinic or cycloparaffinic solvent is greater than or equal to 1:9 if said conjugated diene-monovinylarene copolymer is unhydrogenated, and is greater than or equal to 1:4 if said conjugated diene-monovinylarene copolymer is hydrogenated.

2. A process in accordance with claim 1 wherein said polyphenylene oxide is dissolved in some or all of said aromatic solvent prior to mixing with said polymer cement.

3. A process in accordance with claim 1 or claim 2 comprising adding a solution of polyphenylene oxide in an aromatic hydrocarbon solvent to the product stream of a solution polymerization process at a point where the polymerization has been completed but the conjugated diene-monovinylarene copolymer is still a living alkali metal terminated polymer.

4. A process in accordance with claim 1 or claim 2 wherein a multifunctional coupling agent is added to a living, alkali metal terminated copolymer of conjugated diene and monovinylarene dissolved in a paraffinic and/or cycloparaffinic solvent to form said solution of a coupled copolymer and wherein said solution of polyphenylene oxide in an aromatic solvent is added to the solution of the coupled copolymer in the paraffinic and/or cycloparaffinic solvent.

5. A process in accordance with claim 1 wherein said polyphenylene oxide used in a polyphenylene oxide resin which comprises polyphenylene oxide and a styrene resin.

6. A process in accordance with claim 1 wherein said copolymer is a hydrogenated copolymer.

* * * * *